US006542091B1

(12) United States Patent
Rasanen

(10) Patent No.: US 6,542,091 B1
(45) Date of Patent: Apr. 1, 2003

(54) METHOD FOR ENCODING KEY ASSIGNMENTS FOR A DATA INPUT DEVICE

(76) Inventor: Wayne Allen Rasanen, 3011 Corona Ave., Holiday, FL (US) 34690

( * ) Notice: Subject to any disclaimer, the term of this patent is extended or adjusted under 35 U.S.C. 154(b) by 0 days.

(21) Appl. No.: 09/410,807

(22) Filed: Oct. 1, 1999

(51) Int. Cl.[7] .............................................. H03K 17/94
(52) U.S. Cl. ........................... 341/22; 400/99; 400/489
(58) Field of Search ........................... 341/22; 400/100, 400/99, 489; 345/168

(56) References Cited

U.S. PATENT DOCUMENTS

| | | | | |
|---|---|---|---|---|
| 4,042,777 | A | | 8/1977 | Bequaert et al. ............... 179/79 |
| 4,067,431 | A | | 1/1978 | Whitaker ..................... 197/98 |
| 4,655,621 | A | * | 4/1987 | Holden ........................ 400/100 |
| 4,775,255 | A | | 10/1988 | Langley ....................... 400/485 |
| 4,917,516 | A | | 4/1990 | Retter ......................... 400/489 |
| 4,988,981 | A | | 1/1991 | Zimmerman et al. ........ 340/709 |
| 5,189,416 | A | | 2/1993 | Estes ........................... 341/26 |
| 5,267,181 | A | | 11/1993 | George ........................ 364/709 |
| 5,281,966 | A | | 1/1994 | Walsh .......................... 341/22 |
| 5,432,510 | A | | 7/1995 | Matthews ..................... 341/20 |
| 5,900,864 | A | | 5/1999 | Macdonald .................. 345/172 |
| 6,084,576 | A | * | 7/2000 | Leu et al. ..................... 341/22 |
| 6,199,125 | B1 | * | 3/2001 | Cortesi ........................ 710/67 |

OTHER PUBLICATIONS

Virtual Technologies, Inc., Unlock the door to new possibilities with GesturePlus™ and CyberTouch™. No date, No page number.
Gomes, Lee "Qwerty Spells a Saga of Market Economics", Wall Street Journal. No Date, No page Num.
"The Dvorak Keyboard", Mavis Beacon Teaches Typing—The Speed Typing Alternative, pp. 52–57. No Date.

* cited by examiner

*Primary Examiner*—Timothy Edwards
(74) *Attorney, Agent, or Firm*—Holland & Knight, LLP

(57) ABSTRACT

A data input device and method of encoding key assignments for a data input system which provides for the mapping of the numerous keys, alpha, numeric, symbolic and function, found in a full-sized standard keyboard into ten data input keys. The data input system aids in reducing clutter associated with data input by incorporating all input functions to a minimum of keys. The data input system, whether depressed through a single stroke or combination, evolves data input from a complex system requiring numerous keys laid out in an unwieldy fashion into a system of single finger keys which are actuated in simple combinations. In practice, each key in the primary ten data input key of the present invention acts as a "shift key" creating user options when first depressed. Pressing a subsequent key or keys or releasing the initial depressed key will cause the desired character or function to occur.

9 Claims, 8 Drawing Sheets

METHOD FOR ENCODING KEY ASSIGNMENTS FOR A DATA INPUT DEVICE

BACKGROUND OF THE INVENTION

1. Field of the Invention

This invention relates to data input devices for computers and related devices. More particularly, this invention relates to a keyboard and method of typing or keying which provides for the mapping of the numerous keys found in a full-sized standard keyboard into a data input device which employs primarily ten data input keys. The keyboard and method of the present invention sets both alpha and numeric character inputs in a consecutive order across the operators fingers and requires the simultaneous actuation of no more than two keys to produce any alpha, numeric or symbolic characters. This invention develops a natural way to produce the twenty six-letter alphabet utilizing ten single presses and two thumb-initiated shifts.

2. Description of the Background Art

Presently, there exist many types of devices for data input. The most conventional device used is the QWERTY keyboard that was developed by Charles Latham Sholes and his co-inventors in the late 1800's. The QWERTY keyboard is based upon one or two keys being depressed or manipulated per character data input. More specifically, as to the alphabetic characters, there is one key per letter of the alphabet. It is commonly believed that in order to prevent the mechanical jamming of the mechanical typewriter keys, the QWERTY keyboard was laid out such that commonly used keys are placed far apart thereby minimizing the likelihood of mechanical problems. While the design of the QWERTY keyboard may have been designed to minimize mechanical problems attendant with manual keyboards, it forces the typist to move their fingers in awkward patterns to construct words and requires the typically weakest fingers and left hand to be utilized predominantly. In modem computer keyboards the antiquated QWERTY design has grown to include more than one hundred keys, making it difficult to master touch typing all of the various functions and inputs. Users of typical QWERTY keyboards often suffer from Repetitive Strain Injuries (hereinafter "RSI"), an umbrella term that refers to strain injuries of the neuro-musculoskeletal system such as carpal tunnel syndrome. RSI presumably result from fine fast repetitive activities which adversely affect the hands, wrists, forearms, elbows, arms and shoulders of one or both upper extremities. Notwithstanding its deficiencies, the QWERTY keyboard has long been the standard for word processing and currently remains so.

Attempts have been made over the years to improve upon data input devices and key arrangements in light of advances in keyboard mechanics and the far ranging applications requiring data input.

The Dvorak keyboard was created by an efficiency expert, August Dvorak, and a former college professor, William L. Dealey, in the mid-1930's. The Dvorak keyboard is premised upon the placement of predominantly used keys, such as the vowels on a home row of keys, thereby minimizing the necessity for the user to remove their hands and/or fingers from frequently used characters. The Dvorak keyboard is a full-sized keyboard and although available today, still has never achieved a high level of commercial success.

Attempts to accommodate advances in electronics design and devices requiring data input continued, including the downsizing of computer systems and their integration into diverse applications, efforts are being made to change computer keyboards, peripherals and methods of typing. There is a great deal of prior art relating to alternative keyboard or data entry devices and methods for data input.

Consider background patents that illustrate, for example, keyboard or data entry devices having a reduced number of keys from a standard QWERTY keyboard. Keyboard or data entry devices that are premised upon use of a minimal number of keys are often referred to as chordal or chordic. Typically, chord keyboards have between five and twenty-five keys. See for example, U.S. Pat. No. 5,432,510 to Matthews; U.S. Pat. No. 4,917,516 to Retter and U.S. Pat. No. 4,775,255 to Langley. Similarly, U.S. Pat. No. 4,067,431 to Whitaker discloses a combinational keyboard with movable keys. The disclosure of these patents is incorporated by reference and some may have applicability to the present invention but largely only as representative devices on which the methodology and key assignments of the present invention may be incorporated.

U.S. Pat. No. 4,042,777 to Bequaert et al.; U.S. Pat. No. 5,189,416 to Estes; U.S. Pat. No. 5,267,181 to George; U.S. Pat. No. 5,281,966 to Walsh, and U.S. Pat. No. 5,900,864 to MacDonald, the disclosures of which are incorporated by reference herein, disclose chord keyboards and methods for encoding characters for a chordic keyboard.

U.S. Pat. No. 4,042,777 discloses a one-handed keyboard and control means. Specifically, a keyboard which has ten keys controlled by the four fingers and four keys controlled by the thumb of the same hand. In use, the operator is often required to press several keys, i.e., four adjacent keys, at once to select the desired character or function and must recall the complex arrangement of characters which coincide to the four fingers of the hand operating the keyboard. Similarly, U.S. Pat. No. 5,267,181 discloses an ergonomically correct hand held, eighteen (18) key, chord keyboard designed to be operated by the four fingers and thumb of one hand of the user.

U.S. Pat. No. 5,189,416 discloses a chordal keyboard method and apparatus incorporating a first set of registers and a second set of registers whereby a controller detects when all of the plurality of keys depressed are in a released position and then generates a key code corresponding to symbol locations set in the first set of registers. The method of this invention relies on a particular form of binary Gray code.

U.S. Pat. No. 5,900,864 discloses an input device with a plurality of keys whereby the processor device displays a prompt or indicia to indicate which combination of one or more digits effect the desired instruction or data input and thereby which keys must be activated to achieve the desired effect.

U.S. Pat. No. 5,281,966 discloses a method of encoding only the alphabetic characters for a chord keyboard.

Reduced key or chord keyboards have failed to gain commercial success largely due to the complexity in learning a new system for associating multiple keystrokes to realize specific character inputs and their inability to reproduce the entire functionality of a modern full sized QWERTY computer keyboard. Additionally, prior chord keyboards were typically based upon too few keys, resulting in complex fingering combinations being required to generate each desired character thus slowing the typing process and increasing the likelihood of user error.

Therefore, it is an object of this invention to provide an improvement which overcomes the aforementioned inadequacies of the prior art devices and provide an improvement which is a significant contribution to the advancement of the data input device art.

Another object of this invention is to provide a keyboard and keying system that is capable of emulating the functionality of a standard full sized keyboard, including computer peripheral functionality found on most pointing devices.

Another object of this invention is to provide a small number of keys and reduce or eliminate the movement of the fingers from one key to another, thereby simultaneously reducing the incidence of "hunt and peck" typing.

Another object of this invention is to permit the production of alpha and numeric characters consecutively by actuating no more than two keys and the desired character is generated upon the instant of contact with the second key or release of a single pressed key.

Another object of this invention is to provide a method of data input which is logical and easy to learn and requires only ordinary skill and care on the part of the operator to avoid unwanted keystrokes.

Another object of the invention is to develop a system that can interpret finger positions into a language that contains all data normally derived from a modern full-sized keyboard and may be used to send and receive data.

Another object of the invention is to develop a system which when used with devices that do not accommodate traditional hand placement, at least ten data input keys will be assigned symbolically to the system which may be actuated by alternative means.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention relates to a data input device and method of encoding key assignments for a data input system which provides for the mapping of all the numerous keys, alpha, numeric, symbolic and function, found in a full-sized modern keyboard into ten data input keys. As used herein, symbolic characters shall refer to any commonly used characters such as "@" or "%" typical to a full-sized modern keyboard. The data input system of the present invention aids in reducing keyboard size associated with data input by incorporating all input functions to a minimum of keys. The data input system, whether depressed through a single stroke or combination, evolves data input from a complex system requiring numerous keys laid out in an unwieldy fashion into a system of single finger keys which are actuated in simple combinations. In practice, each key of the primary ten data input keys of the present invention acts as a "shift key" creating user options when first depressed. Pressing a subsequent key or keys or releasing the initial depressed key will cause the desired character or function to occur.

The utilization of ten data input keys, with a simple press and release function, versus upwards of one hundred keys found in a modern QWERTY computer keyboard, permits the data input method of the present invention to be built into many types of previously prohibitive and different devices including, but not limited to, "virtual reality" gloves, computer game devices, cell phones, pagers, car steering wheels, hand held computers and table top keyboards. Additionally, peripheral functionality (e.g., mouse) can be included into the data input system of the present invention to increase functionality.

The present invention can also be used to input data on devices that are too small to accommodate full finger placement. Such a device would preferably consist of at least ten small buttons of which the operator may actuate two or more buttons, with any means necessary, one and then another. This feature allows data devices to evolve into smaller and more easily carried apparatuses and into devices using keys like those of a telephone if programmed with the intended system. This system would enable people the ability to input and access information on a device smaller that current keyboard configurations allow and thus may help advance computing science.

Of the primary ten data input keys, the ten single stroke keys are the letters "a" through "j" and are produced with a single contact and release or keystroke. In a preferred embodiment, the letter "a" starts with the right index finger and "b" the right middle, "c" the ring finger and "d" the pinkie. The right thumb is "e" and the left thumb is "f". The left index, middle, ring and pinkie are "g, h, i, j", respectively. This fixes all vowels to strong fingers by dividing them across the index fingers, both ring fingers and the right thumb digits of the operator's hands. The next eight letters are produced with the right thumb depressed, skipping the left thumb, and the final eight with the lift thumb depressed and skipping the right thumb. Pressing both thumbs causes a shifted result of the next input or makes the next letter capitalized. Numbers 1–5 are produced using the left pinkie through thumb, while depressing the right pinkie and 6–0 are produced with the right thumb through pinkie, while depressing the left pinkie. The keys and functions are logically arranged with word associations, grammatical usage and common functions into sensible combinations making the data input system of the present invention easy to learn and master.

Two-finger simple combinations instead of numerous multiple keys in multiple locations will make typing with the ten key system of the present invention easy to learn. The ten key system of the present invention can produce over 165 common character, command or function inputs and uses combination keys with a buffer to generate multiple keystroke functions such as control-alternate-delete. The data input system of the present invention provides a user with a new mechanism to utilize virtual reality technology and mobile computing, while redefining the possibilities of game play, while providing relaxed hand positioning and reducing the finger distension and agility required with typical QWERTY keyboards.

Unlike most chord keyboards, the data input keyboard and method of the present invention primarily produces the desired character the instant of contact with the second subsequent key or upon release of the initial key if only one key is actuated. Therefore, unlike previous chord keyboards or methods for encoding chord keyboards, the present method does not require an operator to actuate and hold or actuate and release multiple keys simultaneously to generate the desired character thereby improving chord typing speed. Each of the operator's fingers "shift" to allow new options so their hands are not required to leave the home row of ten data input keys. This improvement permits faster typing and data input than with chord keyboards that require more than two keys be pressed or a combination of keys be released to generate a character. The data input system of the present invention emulates all of the input and functionality of a modern full-sized keyboard (which may have in excess of one hundred keys), and may incorporate peripheral functionality. Through the utilization of two or less keys, using caps locks, number lock or scroll lock, the data input system of the present invention can produce over 151 common character, command or function inputs. A minimal number of functions require three keys to be pressed. The present invention overcomes the shortcomings in the prior art because commonly used alphabetic and numeric data is associated in consecutive nature. Other keys build upon letter associations with certain fingers responsible for specific input functions. In this way, common characters and functions are kept together and aid in recollection of similar keys and or characters.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifing or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
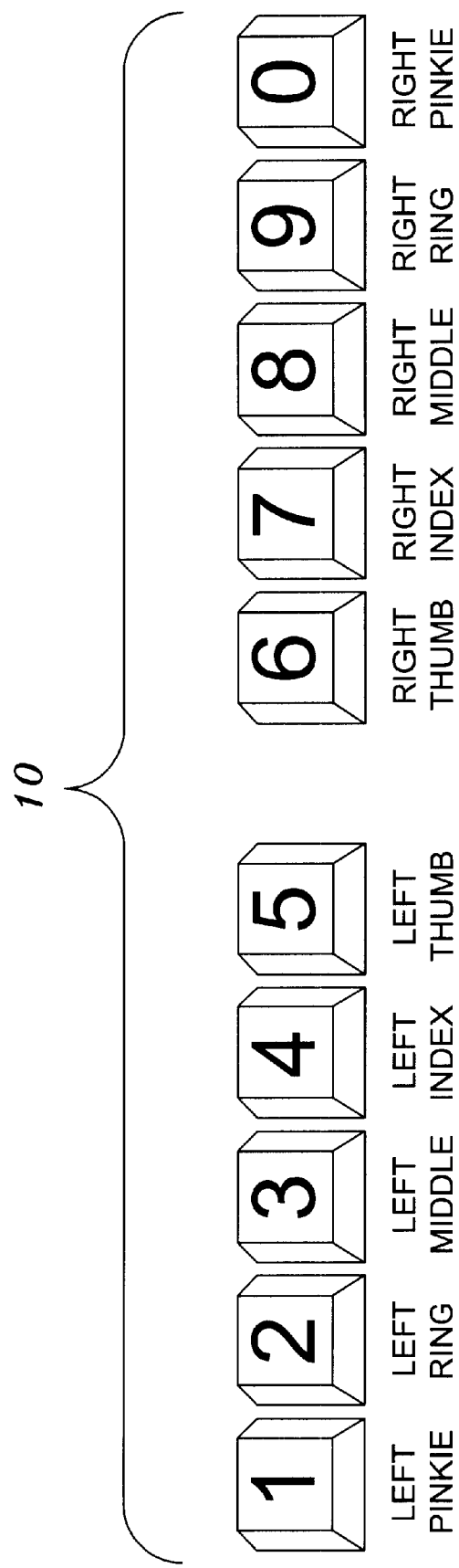
FIG. 1 is a top plan view of an exemplary key layout for a data input device utilizing the method of the present invention.

With reference to FIG. 1, the present invention is premised upon use of data input device having primarily ten simple single depress or "down close" single-pole push button switches (hereinafter "data input keys") 10. The method of the present invention is generally based on encoding characters and keyboard functions to one and two finger or key combinations for standard data input, which follows a consecutive alphanumeric relationship. In one embodiment, the system of the present invention can produce all the various functions of a standard keyboard in the following manner. When an initial key of the ten data input keys is pressed, the data input device enters a state of "enable release generate" or "ERG" and may produce a desired effect if the initial key is released or a subsequent key is pressed. For purposes of the foregoing, a keystroke shall constitute the pressing and subsequent release of an individual key. Whenever a subsequent key is pressed while the initial key is held down, a character or function, as determined by the programming and software of the data input device in conjunction with the utilized microcomputer/computer system, is produced. After the character or function is generated, the data input device enters a state of "disabled release generate" or "DRG" in which any released keys cause no further effect generation.

It should be noted that in circumstances that prohibit an operator from utilizing more than one data input key simultaneously or holding a key and subsequently pressing a second key, i.e. more than one press at a time, the system of the present invention may be programmed such that each initial press would open its corresponding menu and a second press of any key would result in its corresponding action. No action would result from the release of any key under this programming. In this alternative embodiment all input formed normally by the release of a key would be produced by a second press of that key. For example, "a" is produced by two presses of data input key 7 instead of pressing and releasing data input key 7 only once. The right shift command would be produced by pressing key 8, then key 6, and then key 6 again instead of pressing and holding key 8 and then pressing and releasing key 6. Because this programming and method would slow the typing process it is only offered as an alternate to the preferred "two-hand" method of data input. This "one key at a time" method may be incorporated into all of the devices described under the preferred system.

Additionally, the present device can be coded to produce all results based on the order and position of the keys pressed at any given time through response or systematic recheck by the device. By way of example, a micro controller on the device would output signals similar to that of a standard keyboard for interpretation and would communicate with the external processor or computer in the same manner. The method of polling the keys would differ from standard keyboards in the reduced number of keys scanned. The keys may be continually scanned so that any key or combination of keys will be interpreted to generate the output scan codes used to represent keys on a standard keyboard based upon the order of the key(s) struck. For example, to generate an upper case "A", the operator would press, using either their fingers or other actuating means, key 5 and key 6 generating the right shift make scan code "59". Pressing key 7 and releasing it would then generate make scan code "1C" and break scan codes "F01C" and "F059" producing "A" and releasing the shift command. Pressing and releasing the 7 key only would generate make and break scan codes "1C" and "F01C" producing a lower case "a".

It should be well understood to one skilled in the art that the device may be required to output ASCII, RS-232 interface, IBM, Macintosh or any other scan codes depending upon the utilization of the device per its application or implementation.

Figure 2:
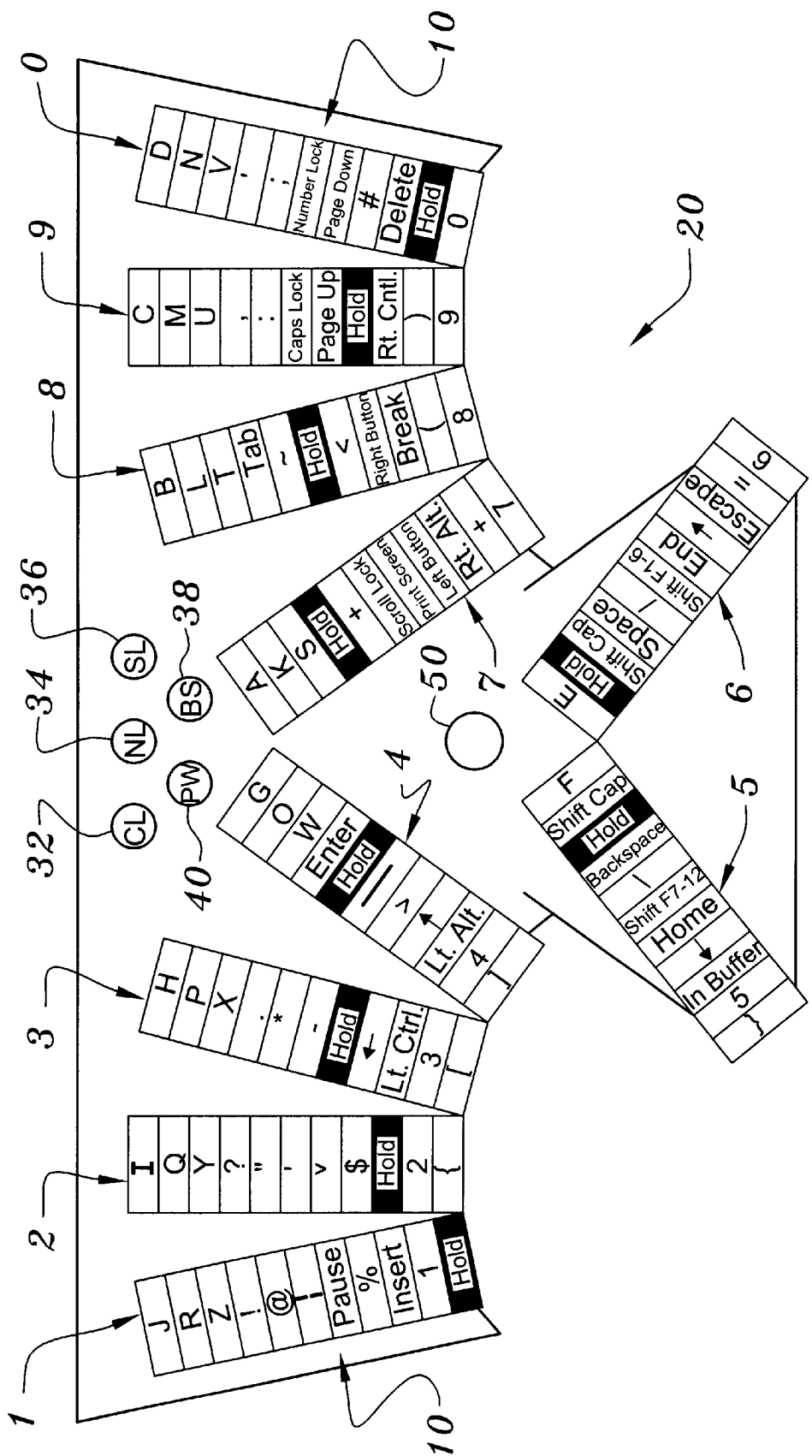
FIG. 2 is a schematic depiction illustrating key assignments for a data input device incorporating ten data input keys.

With reference to Table 2 and FIG. 2, the desired character or function is produced based on the initial key pressed and whether a subsequent key is pressed. This method helps speed the data input process by avoiding most three-finger combinations and providing character or function results at the instant of a subsequent key contact or the single keystroke of the initial key. In FIG. 2, the "hold" keys represent the key depressed first.

After producing a keystroke, any engaged keys, upon their release, generate no additional characters or functions, although the data input device operator may move to another menu, to be discussed in further detail below, by keeping selected key(s) depressed. Special "combiner keys" are available in some shifted menus to provide linking keys to produce common functions such as: control-alt-delete, alt-function 3.

As illustrated in FIG. 1, the method of the present invention is based upon a data input device preferably comprised of at least ten data input keys 10. In a preferred embodiment, the ten data input keys 1 to 9 and 0 are laid out sequentially from left to right. Each of the ten data input keys are assigned to be actuated by an operator's digits or fingers with data input key 1 to be actuated by an operator's left pinkie, data input key 5 to be actuated by an operator's left thumb, data input key 7 to be actuated by an operator's right index finger and data input key 0 to be actuated by an operator's right pinkie respectively. However, it should be well understood that the ten data input keys may be actuated by any appropriate means and the use of all ten digits is not required.

The data input device incorporating the method of the present invention generates alphabetic, numeric or symbolic character signals (hereinafter collectively "characters") and function signals input to a microprocessor or processing device, which may be part of a larger computer system incorporating a display device (not shown). The computer system can be any of several types. The data input device is designed to be used in place of a standard full-sized computer keyboard, but may also be used as a supplement or peripheral device to a standard keyboard. For the purposes of explaining the method of the present invention, the primary ten data input keys are numbered 1 to 9 and 0 respectively and in a preferred embodiment utilizing ten digits, upon a single keystroke the following character(s) will be generated:

TABLE 1

DATA INPUT KEY/OPERATOR DIGIT/SINGLE PRESS RESULT

| Data Input Key | Operator Digit | Resultant Alphabetic Character (Single Keystroke) |
| --- | --- | --- |
| 1 | Left Pinkie | j |
| 2 | Left Ring Finger | i |
| 3 | Left Middle Finger | h |
| 4 | Left Index Finger | g |
| 5 | Left Thumb | f |
| 6 | Right Thumb | e |
| 7 | Right Index Finger | a |
| 8 | Right Middle Finger | b |
| 9 | Right Ring Finger | c |
| 0 | Right Pinkie | d |

As shown in greater detail in Tables 2–4, the method of the present invention is premised upon the idea that the first ten alphabetic characters correspond roughly to the data input keys with the next sequential alphabetic characters, numeric characters and functions being selected through use of menus. The alphabetic and numeric characters are preferably coded sequentially to provide ease in learning and operation. In practice, each of the ten data input keys acts as a "shift key" creating user options when depressed and held. The data input key actuated prompts different user options or menus by which an operator may select a desired character or function to occur by pressing a subsequent key or keys or releasing the initial depressed key.

TABLE 2

ALPHABETIC, NUMERIC, SYMBOLIC AND FUNCTION SELECTION

| 1 | 2 | 3 | 4 | 5 | 6 | 7 | 8 | 9 | 0 | MENU |
|---|---|---|---|---|---|---|---|---|---|---|
| SINGLE PRESS | | | | | | | | | | |
| J | I | H | G | F | E | A | B | C | D | INITIAL |
| THUMB SHIFTS | | | | | | | | | | |
| R | Q | P | O | CAPS | HOLD | K | L | M | N | 1 |
| Z | Y | X | W | HOLD | CAPS | S | T | U | V | 2 |
| INDEX SHIFTS | | | | | | | | | | |
| ! | ? | . | ENTER | Back Space | Space | HOLD | TAB | ' | ` | 3 |
| @ | " | * | HOLD | \ | / | & | ~ | : | ; | 4 |
| MIDDLE SHIFTS | | | | | | | | | | |
| ( | ) | | | L SHIFT | R SHIFT | Scroll Lock | HOLD | caps lock | num lock | 5 |
| PAUSE | ^ | HOLD | > | HOME | END | Print Scrn | < | Page Up | Page Dn. | 6 |
| RING SHIFTS | | | | | | | | | | |
| % | $ | Arrow Lt. | Arrow Up | Arrow Dn. | Arrow Rt. | Lt. Button | Rt. Button | HOLD | # | 7 |
| INSERT | HOLD | Lt. CTRL | Lt. ALT | BUFFER | ESCAPE | Rt. ALT | BREAK | Rt. CTRL | DELETE | 8 |
| PINKY SHIFTS | | | | | | | | | | |
| 1 | 2 | 3 | 4 | 5 | = | + | ( | ) | HOLD | 9 |
| HOLD | { | [ | ] | } | 6 | 7 | 8 | 9 | 0 | 10 |
| Rt. MIDDLE THAN THUMB SHIFTS | | | | | | | | | | |
| F1 | F2 | F3 | F4 | BUFFER | HOLD | F5 | HOLD | F6 | SYS RQ | 11 |
| F7 | F8 | F9 | F10 | HOLD | BUFFER | F11 | HOLD | F12 | Reserved | 12 |

The referenced menus 1 through 12 are explained in greater detail with regard to Tables 3 and 4. Referring to Table 2, when one of the ten data input keys are pressed and released, the single keystroke produces the letters in the bolded top row or initial menu of Table 2. In a preferred embodiment, the default for these alphabetic characters will be lower case. However, the operator can quickly shift the keyboard to caps lock mode by pressing and holding data input key 8 and then key 9. The operator can also quickly capitalize any single letter by first pressing data input keys 5 and 6, releasing them and then pressing the desired letter key(s) whereby the key selected will be capitalized. The "rows" shown in Table 2 correspond to the menus shown in greater detail in Table 3. The gray rows (1, 3, 5, 7, 9, 11 and 12) in Table 2 indicate menus or selections where one of the data input keys 6, 7, 8, 9 or 0 is pressed and held, i.e., "shifted", with the operator's right hand. Conversely, the white rows (2, 4, 6, 8 and 10) shown in Table 2 indicate menus or selections where one of the data input keys 1 through 5 is pressed and held, i.e., "shifted", with the operator's left hand.

In order to choose the functions specified in row or menu 11, an operator must first press and hold key 8 with the right middle finger then press and hold key 6 with the right thumb and thereafter select and press the desired function key. Similarly, in row and corresponding menu 12, an operator must first press and hold key 8 with the right middle finger then press and hold key 5 with the left thumb and thereafter select and press the desired function key.

As shown in Table 2, an operator can readily learn the alphabetic keys through use of three-letter associations. For example, data input key 1, which is actuated by the operator's left pinkie either, through a single keystroke or depression of a first key and subsequent depression, is selected to generate the alphabetic characters "j, r, z". Similarly, data input key 2 corresponds to the characters "i, q, y", data input key 3 corresponds to the characters "h, p, x", data input key 4 corresponds to the characters "g, o, w", data input key 7 corresponds to the characters "a, k, s", data input key 8 corresponds to the characters "b, l, t", data input key 9 corresponds to the characters "c, m, u" and data input key 0 corresponds to the characters "d, n, v". This is a superior system to QWERTY "touch typing" where one finger may be used for up to six letters and another finger for no letters at all.

As used herein, buffer shall mean a temporary area of computer memory for storing input data that corresponds to keystrokes whether interpreted as hexadecimal character codes, digital or other coding. Typically, a buffer will have other attributes such and an input pointer, where new data will be written into the buffer, and output pointer, where the next item will be read. Buffers are used to de-couple processes so that the reader and writer may operate at different speeds or on differed sized blocks of data. This buffer storage would be onboard RAM within the processing device and should be large enough to hold several stacked keys in order to provide any multiple keystroke the user desires. The buffer stacks keys when a combine message is initiated. The combine message may be provided by first pressing data input key 2 with the data input key 5 or data input key 8 with both data input keys 5 and 6, before pressing the desired key(s). Keys that are stacked in the buffer are released whenever another key is pressed that does not have the combine message. When the stacked keys are released, they are processed and delivered to the computer in a similar manner as normal multiple keystrokes are sent.

One skilled in the art of computer software may readily write the software code necessary to recognize the prompts from the data input system of the present invention.

Specifically, the respective assignments of characters/functions, usually represented in hexadecimal or digital form, to the finger actuation key assignment of the present method can readily be determined and recognized by a processing device. It should be well understood by one skilled in the art that the keying arrangement of the present invention might be programmed as necessary to accommodate special requirements or to promote user friendliness.

TABLE 3

MENU OPTIONS, INITIAL AND 1 THROUGH 12
NORMAL UNLOCKED MODE

| | key 1 | key 2 | key 3 | key 4 | key 5 | key 6 | key 7 | key 8 | key 9 | key 0 |
|---|---|---|---|---|---|---|---|---|---|---|
| | | | | Initial menu through menu 12 in unlocked mode. | | | | | | |
| Initial | | | | | | | | | | |
| action state | press ERG | press ERG | press ERG | press ERG | press ERG | press ERG | press ERG | press ERG | press ERG | press ERG |
| action Result | release Buffer & "j" | release Buffer & "i" | release Buffer & "h" | release Buffer & "g" | release Buffer & "f" | release Buffer & "e" | release Buffer & "a" | release Buffer & "b" | release Buffer & "c" | release Buffer & "d" |
| state | DRG | DRG | DRG | DRG | DRG | DRG | DRG | DRG | DRG | DRG |
| menu 1 | | | | | | | | | | |
| action state | | | | | | press ERG | | | | |
| action Result | press Buffer & "r" | press Buffer & "q" | press Buffer & "p" | press Buffer & "o" | left shift to Buffer | release Buffer & "e" | press Buffer & "k" | press Buffer & "l" | press Buffer & "m" | press Buffer & "n" |
| state | DRG | DRG | DRG | DRG | DRG | DRG | DRG | DRG | DRG | DRG |
| menu 2 | | | | | | | | | | |
| action state | | | | | | press ERG | | | | |
| action Result | press Buffer & "z" | press Buffer & "y" | press Buffer & "x" | press Buffer & "w" | release Buffer & "f" | rt shift to Buffer | press Buffer & "s" | press Buffer & "t" | press Buffer & "u" | press Buffer & "v" |
| state | DRG | DRG | DRG | DRG | DRG | DRG | DRG | DRG | DRG | DRG |
| menu 3 | | | | | | | | | | |
| action state | | | | | | | press ERG | | | |
| action Result | press Buffer & "!" | press Buffer & "?" | press Buffer & "." | press Buffer & "enter" | press Buffer & bk space | press Buffer & "space" | release Buffer & "a" | press Buffer & "tab" | press Buffer & "," | press Buffer & "'" |
| state | DRG | DRG | DRG | DRG | DRG | DRG | DRG | DRG | DRG | DRG |
| menu 4 | | | | | | | | | | |
| action state | | | | press ERG | | | | | | |
| action Result | press Buffer & "@" | press Buffer & '"' | press Buffer & "*" | release Buffer & "g" | press Buffer & "\" | press Buffer & "/" | press Buffer & "&" | press Buffer & "~" | press Buffer & ":" | press Buffer & ";" |
| state | DRG | DRG | DRG | DRG | DRG | DRG | DRG | DRG | DRG | DRG |
| menu 5 | | | | | | | | | | |
| action state | | | | | | | | press ERG | | |
| action Result | press Buffer & "|" | press Buffer & "`" | press Buffer & "-" | press Buffer & "_" | Buffer & Lt. shift | Buffer & rt. shift | Buffer & scroll loc | release Buffer | Buffer & cap lock | Buffer & num. loc |
| state | DRG | DRG | DRG | DRG | DRG | DRG | DRG | DRG | DRG | DRG |
| menu 6 | | | | | | | | | | |
| action state | | | press ERG | | | | | | | |
| action Result | press Buffer & "pause" | press Buffer & "^" | release Buffer & "h" | press Buffer & ">" | press Buffer & "home" | press Buffer & "end" | press Buffer & print scr | press Buffer & "<" | press Buffer & page up | press Buffer & pg. down |
| state | DRG | DRG | DRG | DRG | DRG | DRG | DRG | DRG | DRG | DRG |
| menu 7 | | | | | | | | | | |
| action state | | | | | | | | | press ERG | |
| action | press | press | press | press | press | press | press | press | release | press |

TABLE 3-continued

MENU OPTIONS, INITIAL AND 1 THROUGH 12
NORMAL UNLOCKED MODE

|  | key 1 | key 2 | key 3 | key 4 | key 5 | key 6 | key 7 | key 8 | key 9 | key 0 |
|---|---|---|---|---|---|---|---|---|---|---|
| Result | Buffer & "%" | Buffer & "$" | Buffer & cursor lt | Buffer & cursr up | Buffer & cursr dn | Buffer & cursor rt | Buffer & lt mouse | Buffer & rt mouse | Buffer & "c" | Buffer & "#" |
| state | DRG | DRG | DRG | DRG | DRG | DRG | DRG | DRG | DRG | DRG |
| menu 8 | | | | | | | | | | |
| action state |  | press ERG | | | | | | | | |
| action | press | release | press | press | press | press | press | press | press | press |
| Result | Buffer & insert | Buffer & "i" | Buffer & l control | Buffer & left alt | combine in buffer | Buffer & escape | Buffer & right alt | Buffer & break | Buffer & r control | Buffer & delete |
| state | DRG | DRG | DRG | DRG | DRG | DRG | DRG | DRG | DRG | DRG |
| menu 9 | | | | | | | | | | |
| action state | | | | | | | | | | press ERG |
| action | press | press | press | press | press | press | press | press | press | release |
| Result | Buffer & "1" | Buffer & "2" | Buffer & "3" | Buffer & "4" | Buffer & "5" | Buffer & "=" | Buffer & "+" | Buffer & "[" | Buffer & "]" | Buffer & "d" |
| state | DRG | DRG | DRG | DRG | DRG | DRG | DRG | DRG | DRG | DRG |
| menu 10 | | | | | | | | | | |
| action state | press ERG | | | | | | | | | |
| action | release | press | press | press | press | press | press | press | press | press |
| Result | Buffer & "j" | Buffer & "{" | Buffer & "(" | Buffer & ")" | Buffer & "}" | Buffer & "6" | Buffer & "7" | Buffer & "8" | Buffer & "9" | Buffer & "0" |
| state | DRG | DRG | DRG | DRG | DRG | DRG | DRG | DRG | DRG | DRG |
| menu 11 | | | | | | | | | | |
| action state | | | | | | | | | press ERG | |
| action state | | | | | | press ERG | | hold ERG | | |
| action | press | press | press | press | press | release | press | release | press | press |
| Result | Buffer & "f1" | Buffer & "f2" | Buffer & "f3" | Buffer & "f4" | combine in buffer | Buffer & rt. shift | Buffer & "f5" | Buffer & rt. shift | Buffer & "f6" | Buffer & sys rq |
| state | DRG | DRG | DRG | DRG | DRG | DRG | DRG | DRG | DRG | DRG |
| menu 12 | | | | | | | | | | |
| action state | | | | | | | | press ERG | | |
| action state | | | | | | press ERG | | hold ERG | | |
| action | press | press | press | press | release | press | press | release | press | press |
| Result | Buffer & "f7" | Buffer & "f8" | Buffer & "f9" | Buffer & "f10" | Buffer & Lt. shift | combine in buffer | Buffer & "f11" | Buffer & Lt. shift | Buffer & "f12" | Buffer & reserved |
| state | DRG | DRG | DRG | DRG | DRG | DRG | DRG | DRG | DRG | DRG |
| | Single press and release in these modified locked modes | | | | | | | | | |
| num. lock | Buffer & "1" | Buffer & "2" | Buffer & "3" | Buffer & "4" | Buffer & "5" | Buffer & "6" | Buffer & "7" | Buffer & "8" | Buffer & "9" | Buffer & "0" |
| cap lock | Buffer & "J" | Buffer & "I" | Buffer & "H" | Buffer & "G" | Buffer & "F" | Buffer & "E" | Buffer & "A" | Buffer & "B" | Buffer & "C" | Buffer & "D" |
| scroll lock | cursor | cursor | cursor | cursor | cursor | cursor | left button | right button | cursor | cursor |

ERG = enabled release generate
DRG = disabled release generate

Scroll locked results may also be modified by the buffer.

As shown in Table 3, the data input system of the present invention is based on multiple menus of ten options. The initial menu is the base level in which an operator may generate a desired character "a" through "j", by simply pressing and releasing the corresponding data input. When an initial data input key is depressed, the data input system prompts to that primary key's shifted function. If the initial primary key is released before the selection of a subsequent key, i.e., a keystroke is completed, the desired character "a" though "j" will be generated. However, if a subsequent key is pressed, an option from the shifted menu will either generate another character or function or a second shifted menu. Specifically, no additional characters or functions are generated by the initially engaged primary keys upon release, although an operator may progress to another menu by keeping one of the primary keys depressed. Whenever two keys are pressed, no character will be produced upon the release of either key.

The only exception to this rule is the left and right shift keys in menu 5. The shift function is generated only after the shift key is released. The shift command is not generated if another menu 5 option has been selected. This conveniently allows access to the functions in menus 11 and 12 and that of the shift key pressed alone. Depressing both thumbs, as in menus 1 and 2, will produce most shifted functions. This sends the shift command into the buffer to effect the next command received making capitalization and common shifted functions quick and easy. The menus of the present method allow access to all the various keyboard functions. Access to menus 1 through 10 is achieved by holding down any one of the ten keys. Pressing either of the two keys listed in menu 5 that allow the shift command will open menus 11 or 12. The key pressed earliest dictates the menu present at any given time. For example, if the right thumb 6 and then the right index finger 7 were pressed, the result would be "k" from the first menu. If the thumb was then lifted while the index was still pressed, no other effect would occur. The third menu would be open and available to produce another effect from that menu as soon as another key is pressed. No effect will result by lifting either finger.

Special keys or "combiner keys" in menus 8, 11 and 12 will send the next generated character or function into a buffer where it is held until another non-combined character is generated. This causes the command to be sent as if both keys were pressed at the same time. The buffer allows several keys to be stacked as long as a combiner key is depressed prior to or during each successive key. The buffer is released as soon as an un-combined character or function is generated, sending all of the contents for processing.

In order to enter capital lock mode or "cap lock" function, the operator may initially press key 8 and subsequently press key 9, thereby making the single strike release keys into capitalized letters. In order to enter the number lock mode or the "num. lock" function, the operator initially presses key 8 and subsequently presses key 0, thereby defaulting the strike/release keys into the numbers 1 through 0. Scoll lock mode may be selected when an operator initially presses key 8 and subsequently presses key 7. Mouse and cursor features become active full time and both mouse buttons and cursor direction arrows become strike/release or re-strike and hold functions.

TABLE 4

DETAILED ALPHBETIC, NUMERIC AND FUNCTION SELECTION

| Character | keystroke | alt stroke | cap lock | num lock | scroll lock | notes | xtime rep. |
|---|---|---|---|---|---|---|---|
| 1 | 0-1 |  | normal | 1 (10 key) | normal | a | 0-1- |
| 2 | 0-2 |  | normal | 2 (10 key) | normal |  | 0-2- |
| 3 | 0-3 |  | normal | 3 (10 key) | normal |  | 0-3- |
| 4 | 0-4 |  | normal | 4 (10 key) | normal |  | 0-4- |
| 5 | 0-5 |  | normal | 5 (10 key) | normal |  | 0-5- |
| 6 | 1-6 |  | normal | 6 (10 key) | normal |  | 1-6- |
| 7 | 1-7 |  | normal | 7 (10 key) | normal |  | 1-7- |
| 8 | 1-8 |  | normal | 8 (10 key) | normal |  | 1-8- |
| 9 | 1-9 |  | normal | 9 (10 key) | normal |  | 1-9- |
| 0 | 1-0 |  | normal | 0 (10 key) | normal |  | 1-0- |
| a | 7 |  | (6-5)/7 | 1-7 | 5-6/7 | b | 2-5/7/7- |
| b | 8 |  | (6-5)/8 | 1-8 | 5-6/8 |  | 2-5/8/8- |
| c | 9 |  | (6-5)/9 | 1-9 | 5-6/9 |  | 2-5/9/9- |
| d | 0 |  | (6-5)/0 | 1-0 | 5-6/0 |  | 2-5/0/0- |
| e | 6 |  | (6-5)/6 | 1-6 | 5-6/6 |  | 2-5/6/6- |
| f | 5 |  | (6-5)/5 | 0-5 | 5-6/5 |  | 2-5/5/5- |
| g | 4 |  | (6-5)/4 | 0-4 | 5-6/4 |  | 2-5/4/4- |
| h | 3 |  | (6-5)/3 | 0-3 | 5-6/3 |  | 2-5/3/3- |
| i | 2 |  | (6-5)/2 | 0-2 | 5-6/2 |  | 2-5/2/2- |
| j | 1 |  | (6-5)/1 | 0-1 | 5-6/1 |  | 2-5/1/1- |
| k | 6-7 |  | (6-5)/6-7 | normal | normal | c | 6-7- |
| l | 6-8 |  | (6-5)/6-8 | normal | normal |  | 6-8- |
| m | 6-9 |  | (6-5)/6-9 | normal | normal |  | 6-9- |
| n | 6-0 |  | (6-5)/6-0 | normal | normal |  | 6-0- |
| o | 6-4 |  | (6-5)/6-4 | normal | normal |  | 6-4- |
| p | 6-3 |  | (6-5)/6-3 | normal | normal |  | 6-3- |
| q | 6-2 |  | (6-5)/6-2 | normal | normal |  | 6-2- |
| r | 6-1 |  | (6-5)/6-1 | normal | normal |  | 6-1- |
| s | 5-7 |  | (6-5)/5-7 | normal | normal |  | 5-7- |
| t | 5-8 |  | (6-5)/5-8 | normal | normal |  | 5-8- |
| u | 5-9 |  | (6-5)/5-9 | normal | normal |  | 5-9- |
| v | 5-0 |  | (6-5)/5-0 | normal | normal |  | 5-0- |
| w | 5-4 |  | (6-5)/5-4 | normal | normal |  | 5-4- |
| x | 5-3 |  | (6-5)/5-3 | normal | normal |  | 5-3- |
| y | 5-2 |  | (6-5)/5-2 | normal | normal |  | 5-2- |
| z | 5-1 |  | (6-5)/5-1 | normal | normal |  | 5-1- |
| A | 5-6/7 | 6-5/7 | 7 | normal | 6-5/7 | d | cl 2-5/7/7- |
| B | 5-6/8 | 6-5/8 | 8 | normal | 6-5/8 |  | cl 2-5/8/8- |
| C | 5-6/9 | 6-5/9 | 9 | normal | 6-5/9 |  | cl 2-5/9/9- |
| D | 5-6/0 | 6-5/0 | 0 | normal | 6-5/0 |  | cl 2-5/0/0- |
| E | 5-6/6 | 6-5/6 | 6 | normal | 6-5/6. |  | cl 2-5/6/6- |
| F | 5-6/5 | 6-5/5 | 5 | normal | 6-5/5. |  | cl 2-5/5/5- |
| G | 5-6/4 | 6-5/4 | 4 | normal | 6-5/4 |  | cl 2-5/4/4- |
| H | 5-6/3 | 6-5/3 | 3 | normal | 6-5/3 |  | cl 2-5/3/3- |
| I | 5-6/2 | 6-5/2 | 2 | normal | 6-5/2 |  | cl 2-5/2/2- |
| J | 5-6/1 | 6-5/1 | 1 | normal | 6-5/1 |  | cl 2-5/1/1- |
| K | 5-6/6-7 | 6-5/6-7 | 6-7 | normal | normal |  | cl 6-7- |
| L | 5-6/6-8 | 6-5/6-8 | 6-8 | normal | normal |  | cl 6-8- |
| M | 5-6/6-9 | 6-5/6-9 | 6-9 | normal | normal |  | cl 6-9- |
| N | 5-6/6-0 | 6-5/6-0 | 6-0 | normal | normal |  | cl 6-0- |
| O | 5-6/6-4 | 6-5/6-4 | 6-4 | normal | normal |  | cl 6-4- |

TABLE 4-continued

DETAILED ALPHBETIC, NUMERIC AND FUNCTION SELECTION

| | | | | | | | |
|---|---|---|---|---|---|---|---|
| P | 5-6/6-3 | 6-5/6-3 | 6-3 | normal | normal | | cl 6-3- |
| Q | 5-6/6-2 | 6-5/6-2 | 6-2 | normal | normal | | cl 6-2- |
| R | 5-6/6-1 | 6-5/6-1 | 6-1 | normal | normal | | cl 6-1- |
| S | 5-6/5-7 | 6-5/5-7 | 5-7 | normal | normal | | cl 5-7- |
| T | 5-6/5-8 | 6-5/5-8 | 5-8 | normal | normal | | cl 5-8- |
| U | 5-6/5-9 | 6-5/5-9 | 5-9 | normal | normal | | cl 5-9- |
| V | 5-6/5-0 | 6-5/5-0 | 5-0 | normal | normal | | cl 5-0- |
| W | 5-6/5-4 | 6-5/5-4 | 5-4 | normal | normal | | cl 5-4- |
| X | 5-6/5-3 | 6-5/5-3 | 5-3 | normal | normal | | cl 5-3- |
| Y | 5-6/5-2 | 6-5/5-2 | 5-2 | normal | normal | | cl 5-2- |
| Z | 5-6/5-1 | 6-5/5-1 | 5-1 | normal | normal | | cl 5-1- |
| ! | 7-1 | | normal | normal | normal | | 7-1- |
| ? | 7-2 | | normal | normal | normal | | 7-2- |
| . | 7-3 | | normal | 7-3 (10 key) | normal | | 7-3- |
| Enter | 7-4 | | normal | 7-4 (10 key) | normal | | 7-4- |
| backspace | 7-5 | | normal | normal | normal | | 7-5- |
| space bar | 7-6 | | normal | normal | normal | | 7-6- |
| tab | 7-8 | | normal | normal | normal | | 7-8- |
| comma | 7-9 | | normal | normal | normal | | 7-9- |
| apostroph | 7-0 | | normal | normal | normal | | 7-0- |
| @ | 4-1 | | normal | normal | normal | | 4-1- |
| " | 4-2 | | normal | normal | normal | | 4-2- |
| * | 4-3 | | normal | 4-3 (10 key) | normal | | 4-3- |
| \ | 4-5 | | normal | 4-5 (10 key) | normal | | 4-5- |
| / | 4-6 | | normal | normal | normal | | 4-6- |
| & | 4-7 | | normal | normal | normal | | 4-7- |
| ~ | 4-8 | | normal | normal | normal | | 4-8- |
| : | 4-9 | | normal | normal | normal | | 4-9- |
| ; | 4-0 | | normal | normal | normal | | 4-0- |
| ' | 8-1 | | normal | normal | normal | | 8-1- |
| \| | 8-2 | | normal | normal | normal | | 8-2- |
| - | 8-3 | | normal | 8-3 (10 key) | normal | | 8-3- |
| _ | 8-4 | | normal | normal | normal | | 8-4- |
| left shift | 8-5/ | | normal | normal | normal | e | 8-5/8-5- |
| right shift | 8-6/ | | normal | normal | normal | | 8-6/8-6- |
| scroll lock | 8-7 | | normal | normal | normal | f | no repeat |
| cap lock | 8-9 | | normal | normal | normal | g | no repeat |
| num lock | 8-0 | | normal | normal | normal | h | no repeat |
| pause | 3-1 | | normal | normal | normal | | no repeat |
| ` | 3-2 | | normal | normal | normal | | 3-2- |
| > | 3-4 | | normal | normal | normal | | 3-4- |
| home | 3-5 | | 3-5 (10 key) | normal | normal | | 3-5/3-5- |
| end | 3-6 | | 3-6 (10 key) | normal | normal | | 3-6/3-6- |
| print scrn | 3-7 | | normal | normal | normal | | no repeat |
| < | 3-8 | | normal | normal | normal | | 3-8- |
| page up | 3-9 | | 3-9 (10 key) | normal | normal | | 3-9/3-9- |
| pg. down | 3-0 | | 3-0 (10 key) | normal | normal | | 3-0/3-0- |
| % | 9-1 | | normal | normal | normal | | 9-1- |
| $ | 9-2 | | normal | normal | normal | | 9-2- |
| lt arrow | 9-3 | | normal | normal | 3 | i | 9-3- |
| up arrow | 9-4 | | normal | normal | 4 | | 9-4- |
| dn. arrow | 9-5 | | normal | normal | 5 | | 9-5- |
| rt arrow | 9-6 | | normal | normal | 6 | | 9-6- |
| lt mouse | 9-7 | | normal | normal | normal | | 9-7- |
| rt mouse | 9-8 | | normal | normal | normal | | 9-8- |
| # | 9-0 | | normal | normal | normal | | 9-0- |
| insert | 2-1 | | 2-1 (10 key) | normal | normal | | 2-1- |
| lt control | 2-3 | | normal | normal | normal | | 2-3- |
| lt alt | 2-4 | | normal | normal | normal | | 2-4- |
| next x buf | 2-5 | | normal | normal | normal | j | 2-5- |
| escape | 2-6 | | normal | normal | normal | | 2-6- |
| rt alt | 2-7 | | normal | normal | normal | | 2-7- |
| break | 2-8 | | normal | normal | normal | | 2-8- |
| rt control | 2-9 | | normal | normal | normal | | 2-9- |
| delete | 2-0 | | 2-0 (10 key) | normal | normal | | 2-0- |
| { | 1-2 | | normal | normal | normal | | 1-2- |
| ( | 1-3 | | normal | normal | normal | | 1-3- |
| ) | 1-4 | | normal | normal | normal | | 1-4- |
| } | 1-5 | | normal | normal | normal | | 1-5- |
| = | 0-6 | | normal | normal | normal | | 0-6- |
| + | 0-7 | | normal | 0-7 (10 key) | normal | | 0-7- |
| [ | 0-8 | | normal | normal | normal | | 0-8- |
| ] | 0-9 | | normal | normal | normal | | 0-9- |
| f1 | 8-6-1 | | normal | normal | normal | | 8-6-1- |
| f2 | 8-6-2 | | normal | normal | normal | | 8-6-2- |
| f3 | 8-6-3 | | normal | normal | normal | | 8-6-3- |
| f4 | 8-6-4 | | normal | normal | normal | | 8-6-4- |

TABLE 4-continued

DETAILED ALPHBETIC, NUMERIC AND FUNCTION SELECTION

| | | | | | | | | |
|---|---|---|---|---|---|---|---|---|
| f5 | 8-6-7 | | normal | normal | normal | | | 8-6-7- |
| f6 | 8-6-9 | | normal | normal | normal | | | 8-6-9- |
| f7 | 8-5-1 | | normal | normal | normal | | | 8-5-1- |
| f8 | 8-5-2 | | normal | normal | normal | | | 8-5-2- |
| f9 | 8-5-3 | | normal | normal | normal | | | 8-5-3- |
| f10 | 8-5-4 | | normal | normal | normal | | | 8-5-4- |
| f11 | 8-5-7 | | normal | normal | normal | | | 8-5-7- |
| f12 | 8-5-9 | | normal | normal | normal | | | 8-5-9- |
| sys rq | 8-6-0 | | normal | normal | normal | | | no repeat |
| reserved | 8-5-0 | | normal | normal | normal | | | T.B.A. |
| next x buf | 8-6-5 | | normal | normal | normal | | | 8-6-5 |
| next x buf | 8-5-6 | | normal | normal | normal | | | 8-5-6 |
| 10 key sec | 10 key sec | 10 key sec | 10 key sec | 10 key sec | 10 key sec | 10 key sec | 10 key sec | 10 key sec |
| 1 | nl only | | nl only | 1 | nl only | k | | nl 2-5/1/1- |
| 2 | nl only | | nl only | 2 | nl only | | | nl 2-5/2/2- |
| 3 | nl only | | nl only | 3 | nl only | | | nl 2-5/3/3- |
| 4 | nl only | | nl only | 4 | nl only | | | nl 2-5/4/4- |
| 5 | nl only | | nl only | 5 | nl only | | | nl 2-5/5/5- |
| 6 | nl only | | nl only | 6 | nl only | | | nl 2-5/6/6- |
| 7 | nl only | | nl only | 7 | nl only | | | nl 2-5/7/7- |
| 8 | nl only | | nl only | 8 | nl only | | | nl 2-5/8/8- |
| 9 | nl only | | nl only | 9 | nl only | | | nl 2-5/9/9- |
| 0 | nl only | | nl only | 0 | nl only | | | nl 2-5/0/0- |
| enter | nl only | | nl only | 7-4 | nl only | | | nl 7-4- |
| + | nl only | | nl only | 0-7 | nl only | | | nl 0-7- |
| - | nl only | | nl only | 8-3 | nl only | | | nl 8-3- |
| / | nl only | | nl only | 4-6 | nl only | | | nl 4-6- |
| * | nl only | | nl only | 4-3 | nl only | | | nl 4-3- |
| . | nl only | | nl only | 7-3 | nl only | | | nl 7-3- |
| curs dn. lt | sl only | | sl only | sl only | 1 | | | sl 2-5/1/1- |
| curs up lt | sl only | | sl only | sl only | 2 | | | sl 2-5/2/2- |
| lt arrow | sl only | | sl only | sl only | 3 | | | sl 3/3- |
| up arrow | sl only | | sl only | sl only | 4 | | | sl 4/4- |
| dn. arrow | sl only | | sl only | sl only | 5 | | | sl 5/5- |
| rt arrow | sl only | | sl only | sl only | 6 | | | sl 6/6- |
| curs up rt | sl only | | sl only | sl only | 9 | | | sl 2-5/9/9- |
| curs dn rt | sl only | | sl only | sl only | 0 | | | sl 2-5/0/0- |
| home | cl only | | 3-5 | cl only | cl only | | | 3-5- |
| end | cl only | | 3-6 | cl only | cl only | | | 3-6- |
| pg. up | cl only | | 3-9 | cl only | cl only | | | cl 3-9- |
| pg. dn. | cl only | | 3-0 | cl only | cl only | | | cl 3-0- |
| insert | cl only | | 2-1 | cl only | cl only | | | 2-1- |
| delete | cl only | | 2-0 | cl only | cl only | | | 2-1- |
| ctrl-alt-del | 2-5-9/2-5-7/2-0 | 2-5-3/2-5-4/2-0 | | | | | l | |
| alt-f3 | 2-5-7/8-6-3 | | | | | | | | lt pinkie = 1
left ring = 2
lt middle = 3
lt index = 4
lt thumb = 5
rt thumb = 6
rt index = 7
rt middle = 8
rt ring = 9
rt pinkie = 0
hold key = ·
new key = /
a Character code from 10 key section if in num lock mode, repeat characters if applicable when second key is held for interval.
b (6-5) = 6-5 or 5-6 in cap lock, Reversed shift from numbers in num lock, 5-6/ in scroll lock Repeat keys with 2-5 combine function.
c (6-5) = 6-5 or 5-6, repeat character if applicable.
d 6-5 or 5-6, No shift if in cap lock, Repeat keys with 2-5 combine in cap loc, 6-5 only in scr lock
e /· = shift sent only after either of two keys are released. 8-6 & 8-5 open menus 12 & 13
f/g changes mode to scroll lock mode, changes mode to cap lock mode
h changes state to number lock mode
i single key in scroll lock, Repeat key with second hit and hold in scroll lock mode
j 2-5, 8-6-5 & 8-5-6 combines sends next key to buffer to combine w/next key produced.
k 10 key characters produced in special modes
l Combining with (2-5), these buttons don't need to be released before pressing the next key.

With reference to Table 4, a single press and release, or keystroke, of one of the ten data input keys 1 through 9 and 0 generates the desired character "a" through "j". The letter "a" starts with the right index finger or digit 7, "b" the right middle finger 8, "c" the ring finger 9 and "d" the pinkie 0. The right thumb 6 actuates "e" and the left thumb actuates key 5 thereby selecting the character "f". The left index 4, middle 3, ring 2 and pinkie 1 are "g, h, i, j" respectively. This method fixes the vowels to strong fingers by dividing them across both index fingers, both ring fingers and the right thumb.

The next eight letters, "k" through "r", respectively, are produced by depressing and holding data input key 6 with the right thumb and thereafter pressing a subsequent data input key 7 through 0, 4 through 1, skipping the left thumb. The final eight letters, "s" through "z", respectively, are produced by depressing and holding data input key 5 with the left thumb and thereafter pressing a subsequent data input key 7 through 0, 4 through 1, skipping the right thumb. Pressing both thumbs causes the next letter to be capitalized.

Numbers 1–5 are produced depressing and holding data input key 0 with the right pinkie and thereafter pressing a subsequent data input key 1 through 5. Numbers 6–0 are produced holding data input key 1 with the left pinkie and thereafter pressing a subsequent data input key 6 through 9 or 0.

Of next concern are the most commonly used punctuation marks and frequently used keys when writing letters. Strong fingers, capable of withstanding frequent use, should actuate frequently utilized characters. The right index finger 7 is pressed and held or shifted to provide: "space" with the right thumb 6; "backspace" with the left thumb 5; "return" or "enter" with the left index finger 4; "." or period with the left middle or "p" finger 3; "?" or question mark with the left ring or "q" finger 2; and "!" or exclamation mark with the left pinkie 1 to keep all sentence endings together. Furthermore, the right index finger 7 is pressed and held or shifted to provide: "tab" with the right middle 8 or "t" finger; "," comma on the right ring 9 or "c" finger and "'" apostrophe with the right pinkie 0 finger to complete the most commonly used punctuation for composing correspondence.

If the left index finger 4 is pressed and held, it shifts to provide many of the characters required for the e-language used on the Internet. Specifically, while data input key 4 is held: "/" forward slash may be generated by the right thumb 6; "\" back slash may be generated by the left thumb 5; "&" ampersand generated by the right index 7 finger; "~" tilde by the right middle 8 finger; ":" colon by the right ring 9 finger and";" semicolon by the right pinkie 0 finger. While data input key 4 is held: the "@" at key is generated by the left pinkie 1; """ quote on the left ring 2 finger and the "*" asterisk generated by the left middle 3 finger.

With further reference to Table 4, the right middle 8 finger, also used to generate "b, l, t", is the next shift and it provides the three common lock fumctions. "Cap lock" on the right ring 9 or "c" finger, "number lock" on the right pinkie 0 or "n" finger and "scroll lock" on the right index 7 or "s" finger. The line shaped "" underscore; "—" hyphen; "'" accent and "|" pipe characters, round out the left index through pinkie 4-1. Left and right "shift" keys are provided on the thumbs, respectively. While either shift thumb is pressed, access to the "twelve F-keys" is provided by opening menus 11 and 12, the only three finger combination menus in the present key arrangement system.

The left middle 3 or "h/p/x" finger covers most "page" related functions such as "page up" on the right ring 9 or "u" finger; "page down" on the right pinkie 0 or "d" finger. While the data input key 3 is depressed and held, "end" function is generated by the right thumb 6 or "e" finger and "home" is generated by the left thumb 5. While the data input key 3 is depressed and held, the "print screen" function is generated by the right index 7 or "s" finger; ">" greater than by the left index 4 or "g" finger and "<" less than by the right middle 8 or "l" finger; "pause" is generated by the left pinkie 1 and the "^" caret mark is generated by the left ring 2 finger.

The right ring finger 9, or "c/m/u" finger, controls all cursor and mouse functions. With this finger depressed, the mouse or other pointing device becomes active. The right index and middle finger provide left and right mouse buttons, the same fingers most people usually use. The right thumb 6 is the right cursor arrow; the left thumb 5 is arrow down; left index 4 is arrow up and the left middle finger 3 is arrow left. The symbols used for numeric entry: "$" dollar are generated by the left ring 2 finger; "%" percent is generated by the left pinkie 1 and "#" number is generated by the right pinkie 0 thereby keeping these keys near the pinkie shifts which are used to produce numbers. Both ring fingers and pinkies are replaced with diagonal cursor arrows in the scroll lock mode.

The left ring finger 2 is pressed and held to shift to those characters that are most often "married" or paired with another key. Both right and left "control" keys are generated by the right ring 9 finger or "c" finger and left middle 3 finger respectively; "alternate" keys on the right index 7 or "a" finger and left index 4 finger; "insert" on the left pinkie 1; "delete" on the right pinkie 0; "break" on the right middle 8 or "b" finger and "escape" on the right thumb 6 or "e" finger. Pressing the left thumb produces a combiner message which places the next command or character generated into a buffer where it is held and combined with the following command and sent like a multiple-key keystroke.

The last two shifts occur on the pinkies and relate closely to numeric input. The right pinkie 0 or "d/n/v" key shifts the left-hand fingers to form the numbers 1, 2, 3, 4 and 5 from the pinkie to thumb 1 through 5 respectively. The left pinkie 1 shifts the numbers 6, 7, 8, 9 and 0 along the right hand, thumb to pinkie 6 through 9 and 0. The remaining shifts comprise the six different bracket symbols and the "+" plus on the "a" finger and "=" equals on the "e" finger.

Learning the letters produced by each finger will help associate most other functions controlled by that finger. Three letters per finger and one letter for each thumb should be very simple to retain. The finger-letter combinations are respectively: a-k-s, b-l-t, c-m-u, d-n-v, e, f, g-o-w, h-p-x, i-q-y, and j-r-z. Familiarization with these letter combinations helps guide the location of the other functions. Remembering that the right ring finger 9 produces the letters "c" and "m" is all the clue necessary to associate this key to "cursor" and "mouse" functions.

The system of the present invention is capable of entering different states similar to other keyboards, as when "caps lock" or "num lock" is imposed. Additionally, the "scroll lock" function would serve to make all pointing devices and cursor arrows activated and single press keys. Other less essential keys although provided for, such as Sys Rq or print screen, might be reprogrammed to provide "Windows" or "Apple" keys or other services such as macro recording. This could provide users the option to custom map their own key assignments in accord with the present method or use various key combinations to generate words or phrases, and not simply characters or commands. The speed of typing could be enhanced greatly with this technique and improve the users ability to write or chat on-line with others.

Generally speaking, a character is repeated if both keys are continuously held. This method of repeating a character is known in the art.

As illustrated in FIG. 2, a data input device based upon the method of the present invention may utilize a key layout as shown. Optionally, indicating LED's 30 may be incorporated to aid the user in monitoring the status of the data input device. LED 32 indicates when the cap lock mode of the present invention is active. LED 34 indicates when the number lock mode of the present invention is active. LED 36 indicates when the scroll lock mode of the present invention is active. LED 38 indicates the buffer status while LED 40 indicates the power status of the data input device.

The keys and functions are logically arranged with word associations, grammatical usage and common functions into sensible combinations making the ten key system of the present invention easy to learn and master. Two finger simple combinations instead of multiple keys in multiple locations, will make the ten key system of the present invention typing easy to learn. The ten key system of the present invention can produce over 165 common character, command or function inputs and uses combination keys with a "buffer" to generate multiple keystroke functions such as control-alternate-delete. The nomenclature may be displayed on the keys, or in a software solution, the monitor may provide prompts as to what characters/functions are available as each shifting key is depressed.

Figure 3:
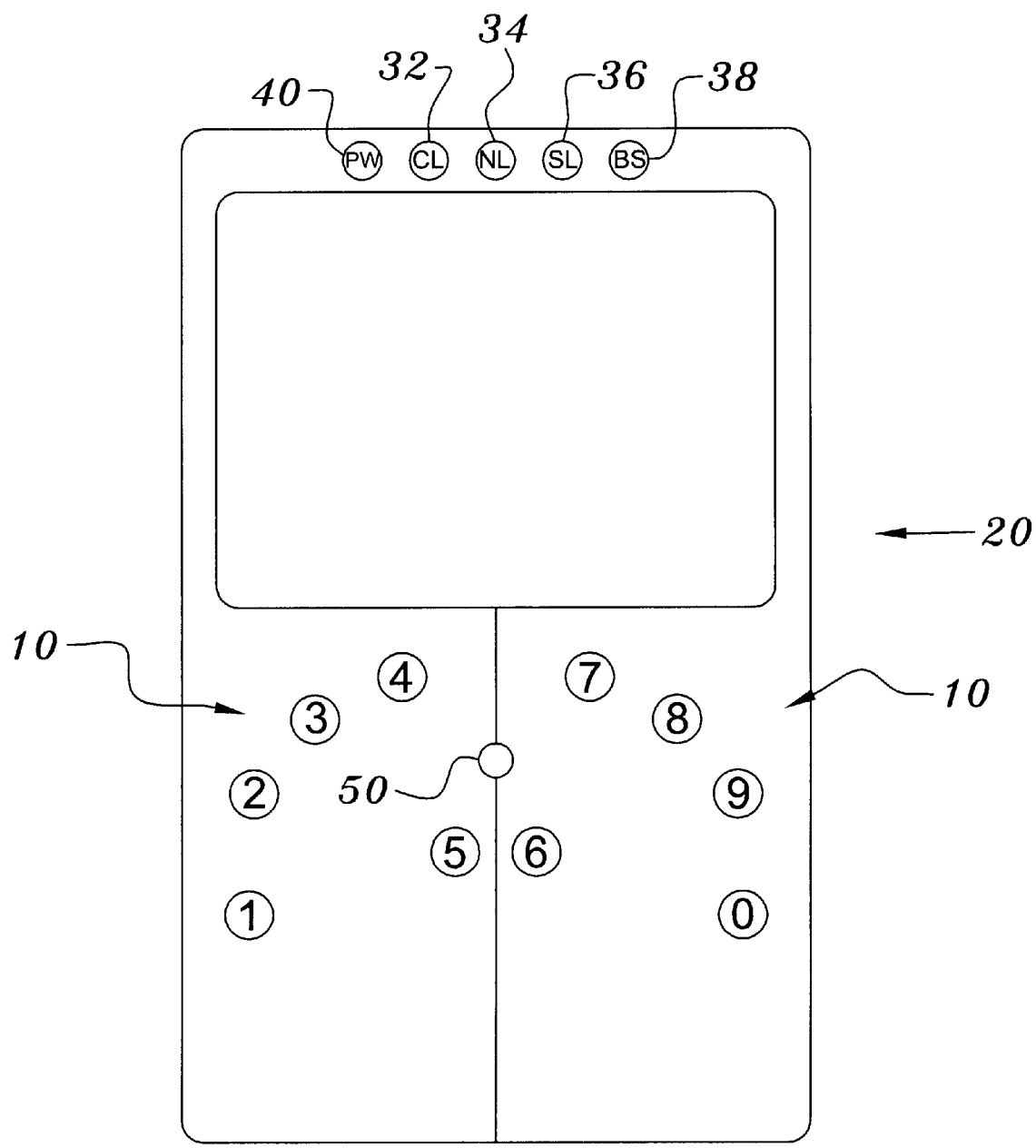
FIG. 3 is a plan view of a data input device incorporating the ten data input keys of the present invention.

As illustrated in FIG. 3, the methodology of the present invention may be incorporated into handheld computer games whereby a computer game player could access any function without having to look away from the screen in order to find the correct keys to press. As shown in FIGS. 4, 4a, 4b and 4c, complex game controllers may utilize the data input keys 10 and key assignments of the present invention in conjunction with peripheral devices 50 such as a trackball or joystick disk/triggers and indicator lights 30.

Figure 4:
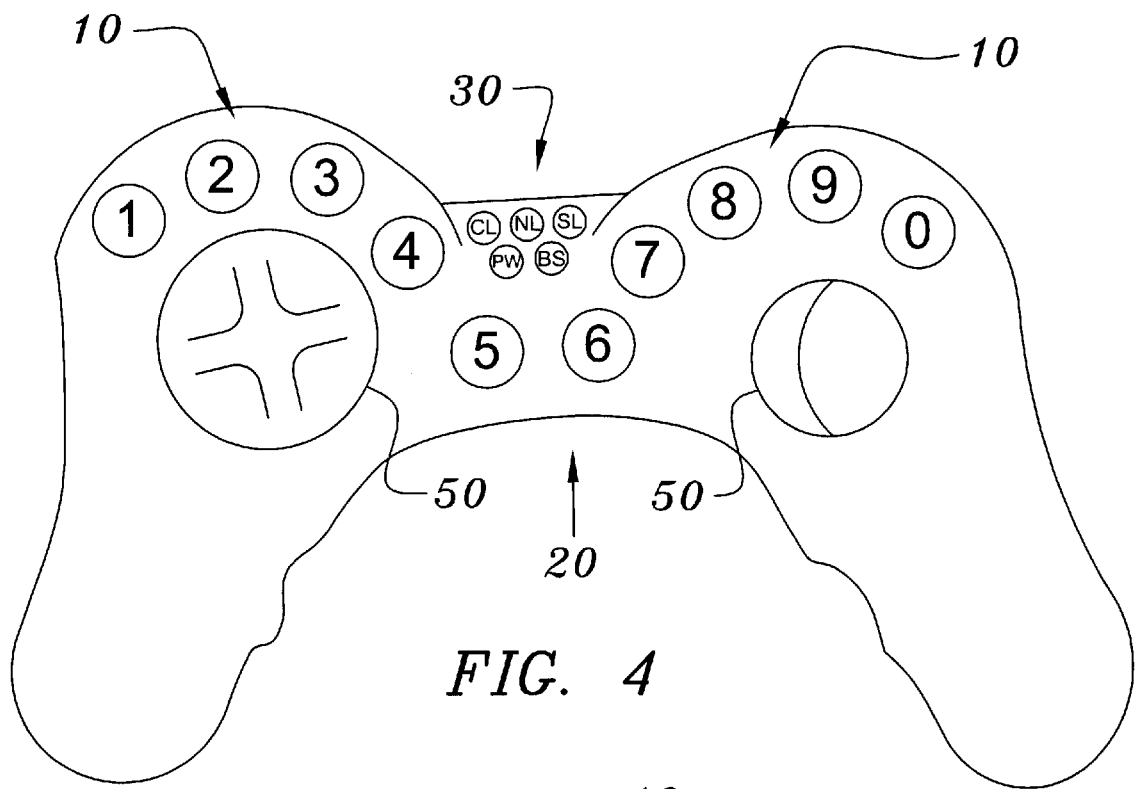
FIG. 4 is a top view of a data input device incorporating the ten data input keys of the present invention.
Figure 4A:
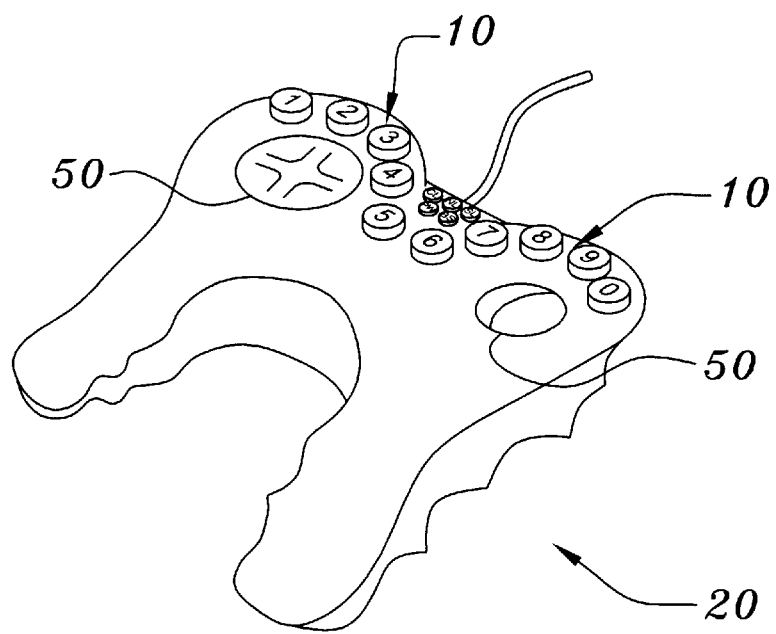
FIG. 4a is a perspective view of the data input device of FIG. 4.
Figure 4B:
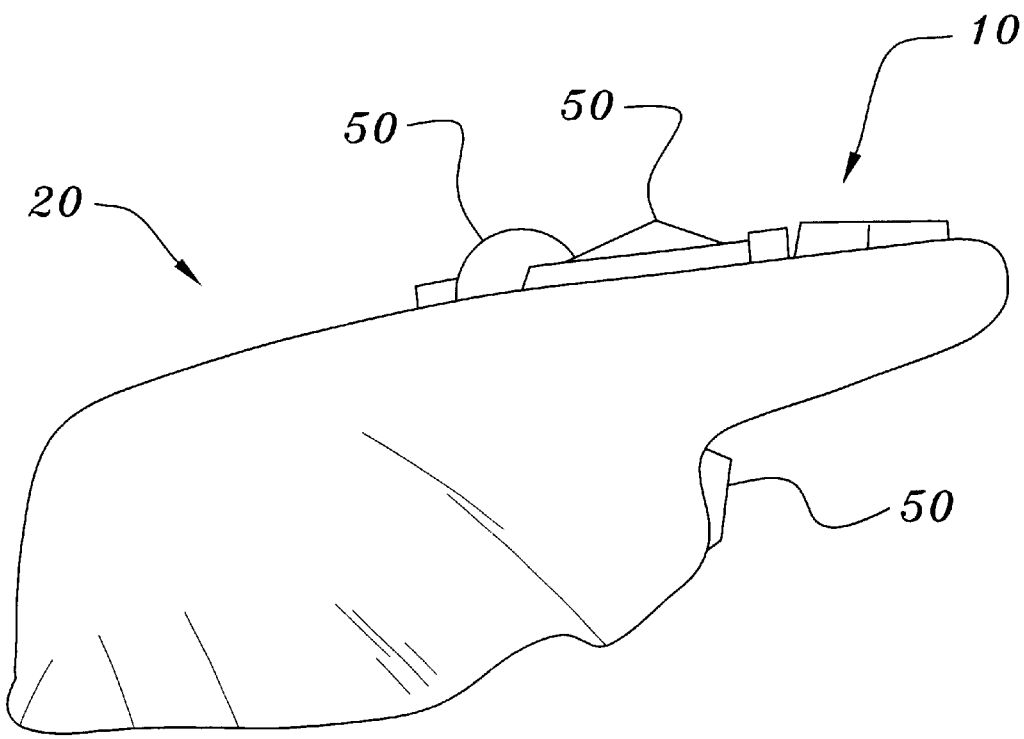
FIG. 4b is a side view of the data input device of FIG. 4.
Figure 4C:
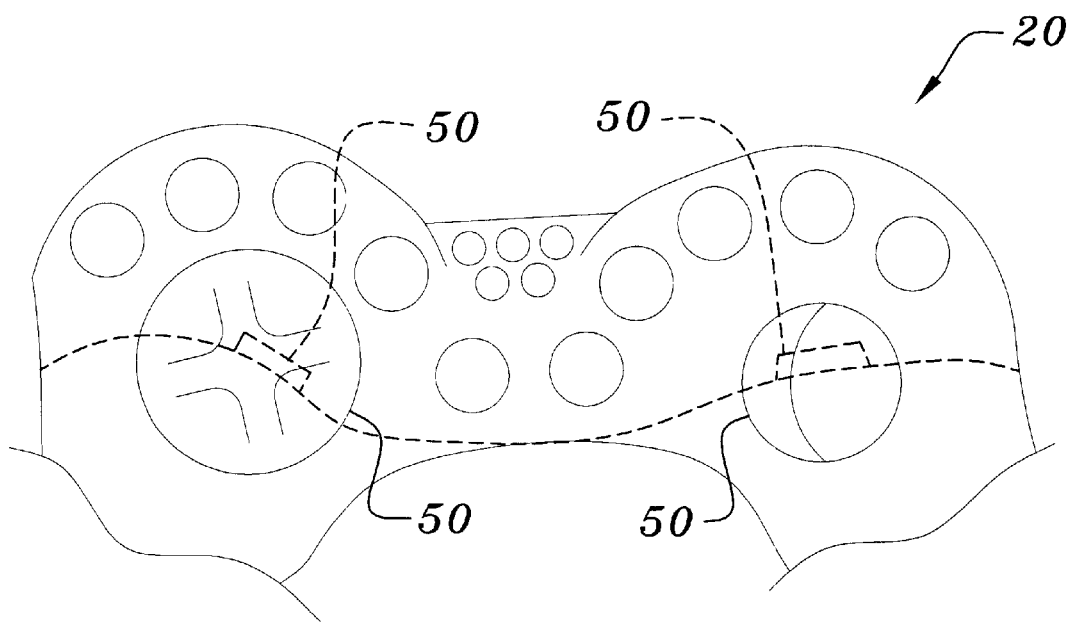
FIG. 4c is a bottom view of the data input device of FIG. 4.
Figure 5:
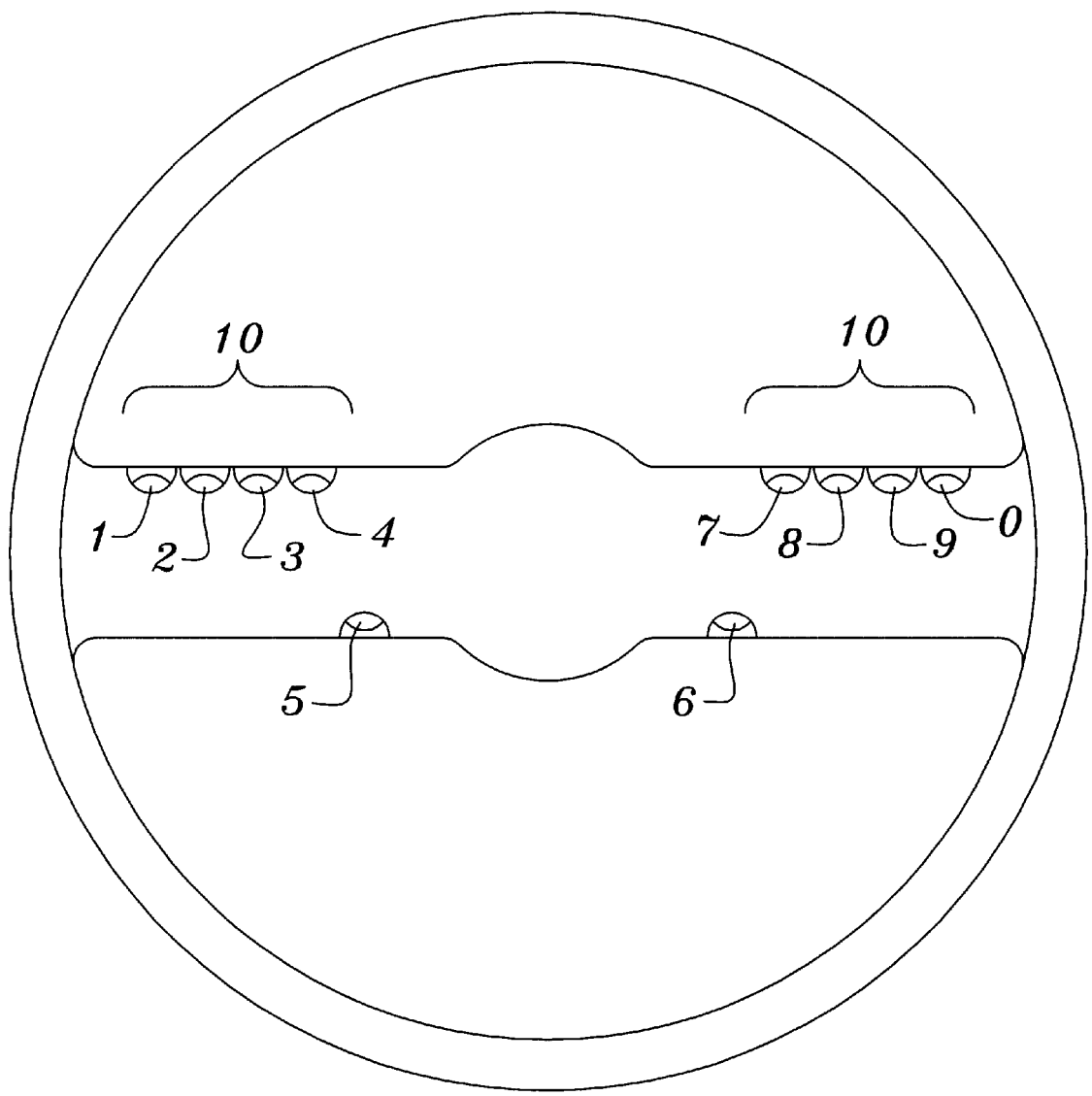
FIGS. 5 through 7 are plan views of representative data input devices incorporating the ten data input keys of the present invention.
Figure 6:
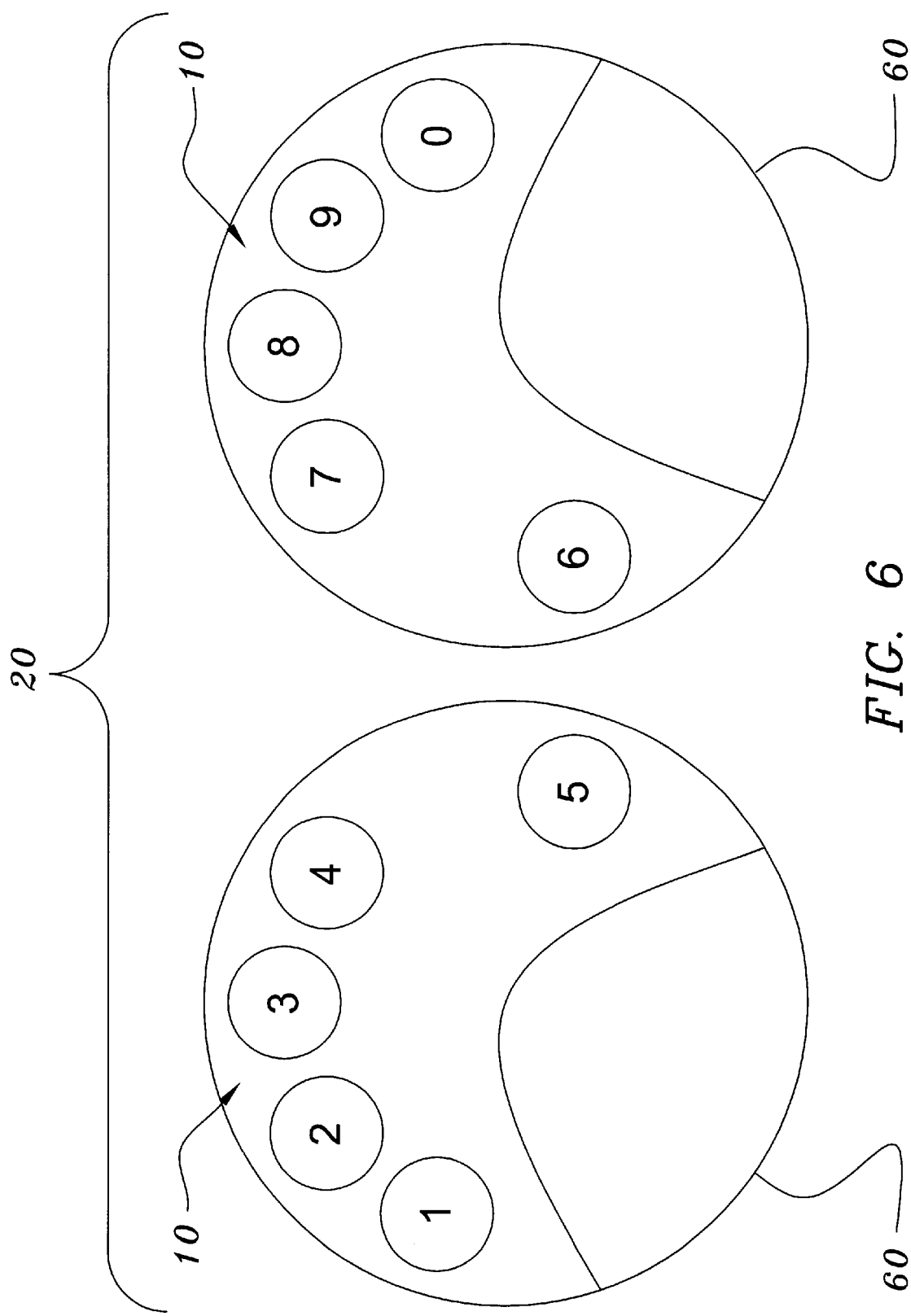

As illustrated in FIG. 5, the methodology of the present invention may readily be incorporated into the steering wheel of a vehicle such that the operator may input data to control vehicle operations without having to remove their hands from the wheel. Data input based upon the ten key system of the present invention may be enhanced by permitting users the ability to type while simultaneously operating peripheral devices such as a mouse or track ball. As illustrated in FIGS. 2 and 4, a data input device 20 can combine the ten input keys 10 of the present invention with a peripheral device 50. The most commonly used peripheral or spatial devices are mice, trackballs and joysticks. These devices permit the user to input information and manipulate visual displays on the cathode ray tube (CRT) employed with most computer devices. In a further modification, FIG. 6, the ten data input keys 10 of the present invention may be incorporated directly into mice 60 such that the user may readily input a broad range of data and manipulate data such as moving cursor or insertion point markers, operating pull-down menus and windows, manipulating on screen text and drawings, and generating graphics.

Figure 7:
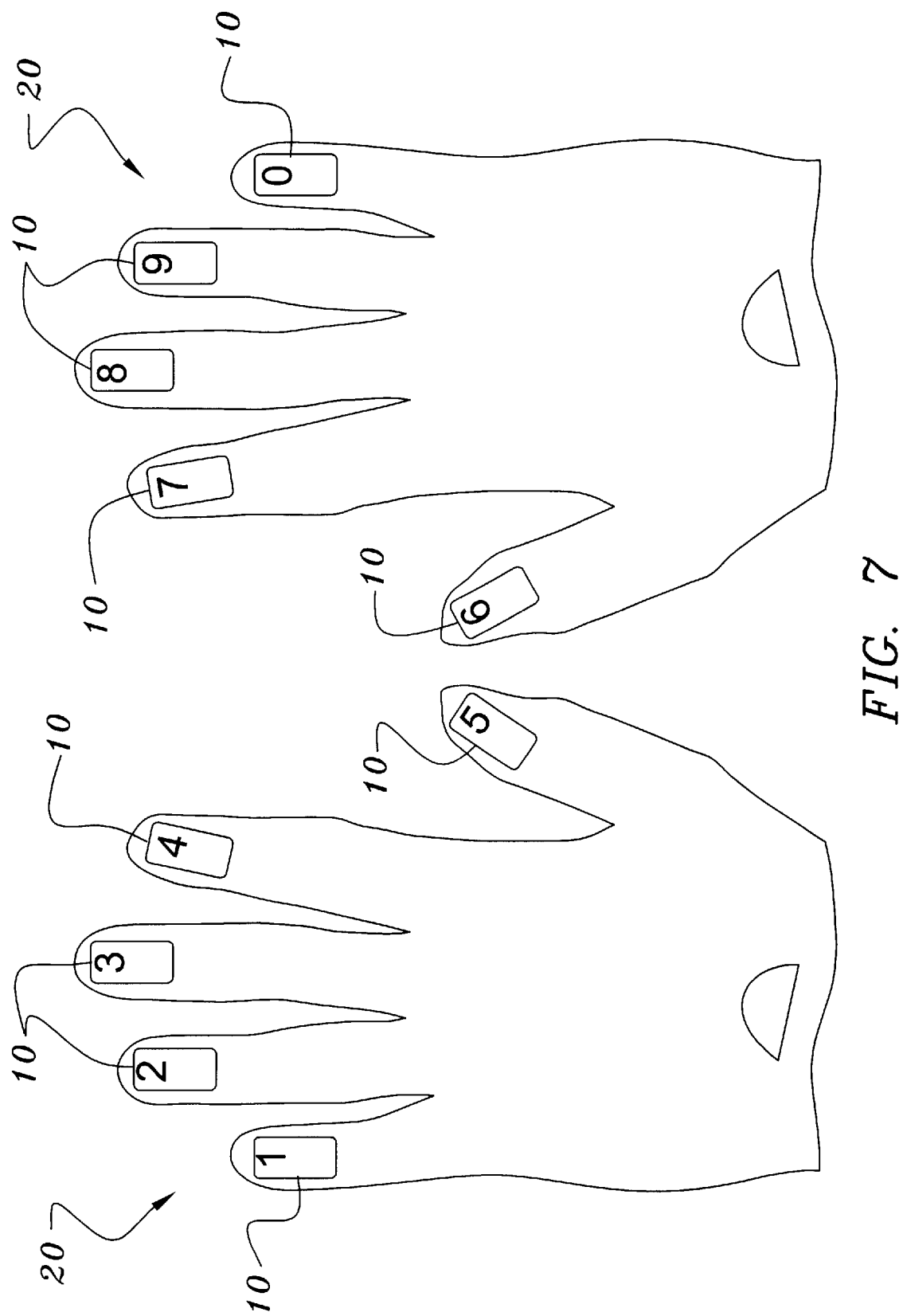

Additionally, as illustrated in FIG. 7, the methodology of the present invention may readily be incorporated into gloves, such as virtual reality gloves, utilizing proximity switch at the finger tips, and utilized in applications which utilize bulky suits that make normal keyboard data input prohibitive. See for instance U.S. Pat. No. 4,988,981 to Zimmerman et al., the disclosure of which is incorporated herein in its entirety by reference. Additional utilization of the present invention would include military applications thereby permitting an operator to input and access data without necessitating removal of their hands from the controls in planes, etc.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention. Now that the invention has been described,

What is claimed is:

1. A method of encoding key assignments for a data input device comprising the steps of:

providing a data input device having at least ten individual data input keys each being capable of being actuated by an operator;

encoding characters to the data input keys wherein the simultaneous actuation of no more than two data input keys is required to generate said characters;

actuating the encoded data input keys to generate the desired character;

providing a processing means for reading the encoded characters; and wherein, to generate an alphabetic character "a" through "j", the operator actuates the encoded data input key that corresponds to the desired alphabetic character.

2. The method as in claim 1, wherein the first data input key is encoded with the alphabetic character "j", the second data input key is encoded with the alphabetic character "i", the third data input key is encoded with the alphabetic character "h", the fourth data input key is encoded with the alphabetic character "g", the fifth data input key is encoded with the alphabetic character "f", the sixth data input key is encoded with the alphabetic character "e", the seventh data input key is encoded with the alphabetic character "a", the eighth data key input is encoded with the alphabetic character "b", the ninth data input key is encoded with the alphabetic character "c" and the tenth data input key is encoded with the alphabetic character "d".

3. The method as in claim 1, wherein to capitalize said characters, an operator first presses and releases the fifth and sixth data input keys and thereafter actuates said encoded data input key to generate the desired character.

4. The method as in claim 1, wherein to continually capitalize said characters, an operator presses the eighth and then ninth data input keys, releases both, and thereafter actuates said encoded data input key to generate the desired character.

5. The method as in claim 1, wherein the first data input key is encoded with the characters "r", "z" and "1", the second data input key is encoded with the characters "q", "y" and "2", the third data input key is encoded with the characters "p", "x" and "3", the fourth data input key is encoded with the characters "d", "w" and "4", the fifth data input key is encoded with the character "5", the sixth data input key is encoded with the character "6", the seventh data input key is encoded with the characters "k", "s" and "7", the eighth data input key is encoded with the characters "l", "t" and "8", the ninth data input key is encoded with the characters "m", "u" and "9" and the tenth data input key is encoded with the characters "n", "v" and "0".

6. A method of encoding key assignments for a data input device comprising the steps of:

providing a data input device having at least ten individual data input keys each being capable of being actuated by an operator's fingers;

assigning the ten data input keys for actuation by an operator's left pinkie, an operator's left ring finger, an operator's left middle finger, an operator's left index finger, an operator's left thumb, an operator's right thumb, an operator's right index finger, an operator's right middle finger, an operator's right ring finger and an operator's right pinky respectively;

encoding characters and functions to the data input keys;

providing a means to prompt different menu options for the selection of characters or functions;

actuating the encoded data input keys, whether individual or combined, to select the desired menu option;

providing a processing means for reading the encoded alphabetic and numeric characters;

wherein the means to prompt different menu options is the actuation of one or more of the data input keys; and wherein the operator selects the menu options as follows:

| | |
|---|---|
| initial menu | no data input key is held |
| menu one | the sixth data input key is held |
| menu two | the fifth data input key is held |
| menu three | the seventh data input key is held |
| menu four | the fourth data input key is held |
| menu five | the eighth data input key is held |
| menu six | the third data input key is held |
| menu seven | the ninth data input key is held |
| menu eight | the second data input key is held |
| menu nine | the tenth data input key is held |
| menu ten | the first data input key is held |
| menu eleven | the sixth and eighth data input key is held |
| menu twelve | the fifth and eighth data input key is held. |

7. A data input device having at least ten individual data input keys each being capable of being actuated by an operator's fingers;

wherein characters are encoded to the data input keys whereby the simultaneous actuation of no more than two data input keys is required to generate said characters;

a processing means for reading the encoded characters; and wherein, to generate an alphabetic character "a" through "j", the operator actuates the encoded data input key that corresponds to the desired alphabetic character.

8. The method as in claim 7, wherein the first data input key is encoded with the alphabetic character "j", the second data input key is encoded with the alphabetic character "i", the third data input key is encoded with the alphabetic character "h", the fourth data input key is encoded with the alphabetic character "g", the fifth data input key is encoded with the alphabetic character "f", the sixth data input key is encoded with the alphabetic character "e", the seventh data input key is encoded with the alphabetic character "a", the eighth data input key is encoded with the alphabetic character "b", the ninth data input key is encoded with the alphabetic character "c" and the tenth data input key is encoded with the alphabetic character "d".

9. The method as in claim 7, wherein the first data input key is encoded with the characters "r", "z" and "1", the second data input key is encoded with the characters "q", "y" and "2", the third data input key is encoded with the characters "p", "x" and "3", the fourth data input key is encoded with the characters "o", "w" and "4", the fifth data input key is encoded with the character "5", the sixth data input key is encoded with the character "6", the seventh data input key is encoded with the characters "k", "s" and "7", the eighth data input key is encoded with the characters "l", "t" and "8", the ninth data input key is encoded with the characters "m", "u" and "9" and the tenth data input key is encoded with the characters "n", "v" and "0".

* * * * *

UNITED STATES PATENT AND TRADEMARK OFFICE
CERTIFICATE OF CORRECTION

PATENT NO.    : 6,542,091 B1                                                   Page 1 of 1
DATED         : April 1, 2003
INVENTOR(S)   : Wayne Allen Rasanen It is certified that error appears in the above-identified patent and that said Letters Patent is hereby corrected as shown below:

Column 1,
Line 41, delete "modem" and change to -- modern -- as follows:
"In modern computer keyboards"...

Column 21,
Line 52, delete "fumctions" and change to -- functions -- as follows:
"provides the three common lock functions."
Line 55, delete """ and change to -- _ -- as follows:
"the line shaped "_" underscore;"

Column 24,
Line 35, "key input" should read -- eighth data input key is encoded with the alphabetic --
Line 53, delete "d" and change to -- o -- as follows:
"encoded with the characters "o", "w" and "4", Signed and Sealed this Nineteenth Day of August, 2003

JAMES E. ROGAN
*Director of the United States Patent and Trademark Office*